United States Patent
Soepenberg et al.

(10) Patent No.: US 7,590,111 B1
(45) Date of Patent: Sep. 15, 2009

(54) TRANSMISSION OF A MULTIPLEX SIGNAL COMPRISING A CAROUSEL HAVING A PLURALITY OF MODULES

(75) Inventors: Gerrit H. Soepenberg, Eindhoven (NL); Ronald M. Tol, Eindhoven (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 696 days.

(21) Appl. No.: 09/329,391

(22) Filed: Jun. 10, 1999

(30) Foreign Application Priority Data

Jun. 12, 1998 (EP) .................. 98201975

(51) Int. Cl.
*H04L 12/28* (2006.01)
(52) U.S. Cl. ..................................... 370/389
(58) Field of Classification Search ............... 370/389, 370/432, 486–488, 395.32, 395.71, 395.72, 370/410, 428, 429; 348/725; 725/28, 29, 725/34, 44–48, 110
See application file for complete search history.

(56) References Cited

U.S. PATENT DOCUMENTS

| | | | |
|---|---|---|---|
| 5,418,782 A | | 5/1995 | Wasileski |
| 5,420,866 A | * | 5/1995 | Wasilewski ................. 370/389 |
| 5,517,652 A | * | 5/1996 | Miyamoto et al. .......... 395/800 |
| 5,614,940 A | * | 3/1997 | Cobbley et al. ............. 725/138 |
| 5,734,589 A | * | 3/1998 | Kostreski et al. ........... 715/716 |
| 5,828,402 A | * | 10/1998 | Collings ..................... 348/5.5 |
| 5,878,135 A | * | 3/1999 | Blatter et al. ............... 380/239 |
| 5,963,645 A | * | 10/1999 | Kigawa et al. ............... 380/10 |
| 6,005,561 A | * | 12/1999 | Hawkins et al. ............. 345/327 |
| 6,029,193 A | * | 2/2000 | Yamamoto et al. .......... 709/217 |
| 6,064,676 A | * | 5/2000 | Slattery et al. ............. 370/412 |
| 6,185,585 B1 | * | 2/2001 | Sequeira ..................... 715/513 |
| 6,317,885 B1 | * | 11/2001 | Fries .......................... 725/109 |
| 6,374,404 B1 | * | 4/2002 | Brotz et al. ................... 725/46 |
| 6,757,305 B1 | * | 6/2004 | Soepenberg et al. ........ 370/536 |
| 2003/0022643 A1 | * | 1/2003 | Djupsjobacka et al. ... 455/158.1 |

FOREIGN PATENT DOCUMENTS

WO     WO 9826528     6/1998

OTHER PUBLICATIONS

Pekowsky, Stuart, et al., "The Set-Top Box as Multi-Media Terminal," IEEE Transactions on Consumer Electronics, vol. 44, No. 3, Aug. 1998, pp. 833-840.

* cited by examiner

*Primary Examiner*—Dmitry Levitan

(57) ABSTRACT

A transmission system in which the transmitter (10) transmits a multiplex signal (12) to the receiver (14). The multiplex signal includes a periodically repeated plurality of modules (42) which each comprise at least one object (32,36,40). The receiver comprises extracting means (16) for extracting objects from the multiplex signal. The extraction is performed based on module related information which is included in the multiplex signal.

5 Claims, 1 Drawing Sheet

TRANSMISSION OF A MULTIPLEX SIGNAL COMPRISING A CAROUSEL HAVING A PLURALITY OF MODULES

FIELD OF THE INVENTION

The invention relates to a transmission system for transmitting a multiplex signal from a transmitter to a receiver, said multiplex signal comprising a periodically repeated plurality of modules, the modules each comprising at least one object, the receiver comprising extracting means for extracting objects from the multiplex signal.

The invention further relates to a transmitter for transmitting a multiplex signal, a receiver for receiving a multiplex signal and a multiplex signal comprising a periodically repeated plurality of modules.

DESCRIPTION OF THE RELATED ART

A transmission system of the type described above is known from the International Organization for Standardization/International Electrotechnical Commission (ISO/IEC) International Standard 13818-6. "MPEG-2 Digital Storage Media Command and Control" Jul. 12, 1996 (where "MPEG-2" refers to version 2 of the Motion Pictures Expert Group standard). In modern digital broadcast systems a transmitter, e.g., a headend, typically transmits a large number of services (or channels) to a plurality of receivers, like for instance television sets or set-top boxes. Such a service can contain an audio/video stream, an interactive application (for example in accordance with version 5 of the Multimedia and Hypermedia information coding Expert Group or "MHEG-5" format), other kinds of data or a combination of these elements. An MPEG-2 transport stream is a multiplex of a number of services. Typically, a transmitter transmits several transport streams to the set-top boxes. A set-top box can tune to a specific transport stream and is then able to retrieve information from the transport stream. Such a set-top box typically has only one tuner and is thus merely able to receive one single transport stream at a time. When a user wants to look at a television program, or wants to run an interactive application, or wants to access other kinds of data the set-top box or television set tunes to the corresponding transport stream and retrieves and processes the required data from the service as it is being broadcast at that moment.

Interactive applications like for instance tele-banking, tele-shopping or an electronic newspaper are typically broadcast in a carousel-like fashion, i.e., the therewith corresponding data sections are repeated periodically in the transport stream. For instance, both the Digital Video Broadcasting (DVB) and Digital Audio-Visual Council (DAVIC) standards have specified Digital Storage Media Command and Control (DSM-CC) protocol object carousels as known from the above mentioned document for broadcasting interactive applications. The response time of this kind of application can be improved considerably by applying some kind of caching in the set-top box, i.e. pre-fetching and storing sections in the set-top box which are likely to be accessed in the future. Otherwise, if pre-fetching and caching is not used and the set-top box wants to retrieve a part of the interactive application, the set-top box must wait until that particular part is broadcast again. In order to be able to cache data, the set-top box must have access to a storage device like for instance a hard disk. The set-top box can also use this storage device to store linear television content, like for instance short news bulletins or weather forecasts. These programs can be viewed by the user whenever this is convenient.

The objects of a DSM-CC object carousel are broadcast in modules. Such a module is a container of objects and comprises a number of DownloadDataBlock messages (which are MPEG-2 private sections). When a set-top box wants to pre-fetch a DSM-CC object, it must (among other things) know in which module the object resides. After it has retrieved the right module, the set-top box must parse the module to get to the object itself. Due to the hierarchical nature of the DSM-CC object carousel an object might be included in a subdirectory. If this is the case, the set-top box must also retrieve the module(s) with the intermediate directories, and parse them before it gets to the object in which it is interested. Typically, the service provider broadcasts the object carousel in a compressed form. This compression is normally done at the module level. Thus, retrieving an object requires also the decompression of all the modules that are needed for the retrieval of the objects the set-top box is interested in. So, making use of the hierarchical nature of the DSM-CC object carousel for the purpose of pre-fetching objects requires a lot of processing in the set-top box.

SUMMARY OF THE INVENTION

An object of the invention is to provide a transmission system, wherein the receiver is able to pre-fetch objects in a relatively simple manner. This object is achieved in the transmission system according to the invention, which is characterized in that the extracting means are embodied so as to extract the objects in dependence on module related information present in the multiplex signal. By including module related pre-fetch information in the transport stream, for instance by adding a pre-fetch tag to all modules, the receiver does not need to parse any module during the pre-fetching process. Furthermore, the receiver can store the modules efficiently, i.e. modules which are transmitted in a compressed form can be stored in that compressed form. A third advantage of this set-up is that it is easy to find out which modules should be pre-fetched.

An embodiment of the transmission system according to the invention is characterized in that the module related information is contained in a single information section. By concentrating the module related pre-fetch information for all modules included in the transport stream into a single information section the receiver can quickly get a complete view of all pre-fetchable modules included in the transport stream by simply reading this information section. In this way, the receiver can easily find out which modules it has to pre-fetch.

BRIEF DESCRIPTION OF THE DRAWINGS

The above object and features of the present invention will be more apparent from the following description of the preferred embodiments with reference to the drawings, wherein.

DESCRIPTION OF THE PREFERRED EMBODIMENTS

Figure 1:
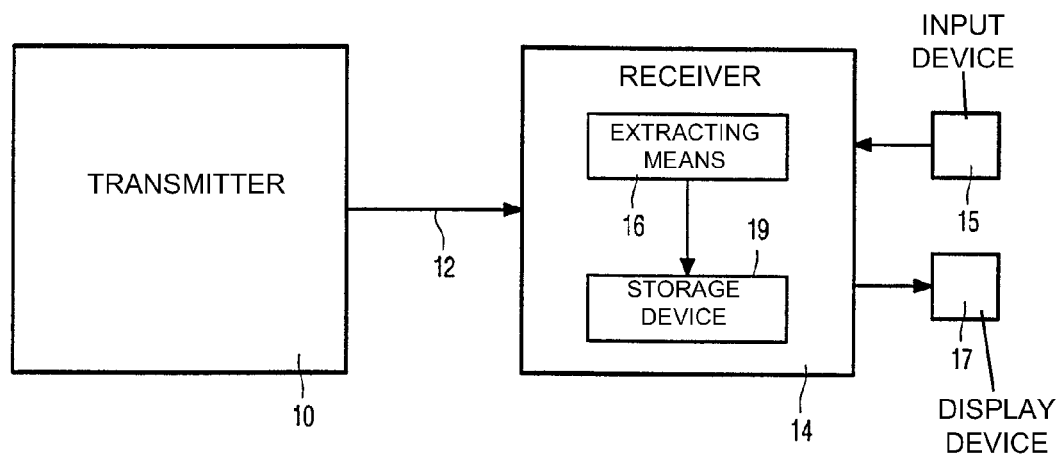
FIG. 1 shows a block diagram of a transmission system according to the invention.

FIG. 1 shows a block diagram of a transmission system according to the invention. In such a transmission system a number of multiplex signals 12 are transmitted by a transmitter 10 to a receiver 14. The transmission system may comprise further receivers 14. The transmission system according to the invention can be used in a cable television (CATV) network environment, whereby the transmitter 10 comprises the headend of the CATV-network and the receivers 14 comprise the set-top boxes or the television sets of the end-users. The end-users are able to control a receiver 14 by means of a input device 15, like for instance a keyboard or a remote control. The end-users can view the selected services on a display device 17.

The multiplex signals 12 can be implemented in the form of MPEG-2 transport streams. An MPEG-2 transport stream is a multiplex of a number of so-called services. Such a service can contain an audio/video stream, an interactive application (for example in the MHEG-5 format), other kinds of data or a combination of these elements. Typically, a headend 10 transmits several transport streams 12 to the set-top boxes 14. In this way, a large number of services (or channels) can be broadcast by the headend 10 to a plurality of set-top boxes 14.

A set-top box can 14 tune to a specific transport stream 12 and is then able to retrieve information from the transport stream 12. Such a set-top box 14 typically has only one tuner and is thus merely able to receive a single transport stream 12 at a time. When a user wants to look at a television program, or wants to run an interactive application, or wants to access other kinds of data the set-top box 14 tunes to the corresponding transport stream 12 and retrieves and/or processes the required data from the service as it is being broadcast at that moment.

Interactive applications like for instance tele-banking, tele-shopping or information services are typically broadcast in a carousel-like fashion, i.e. the therewith corresponding data sections are repeated periodically in the transport stream 12. For instance, both DVB and DAVIC have specified DSM-CC object carousels for broadcasting interactive applications. The response time of this kind of applications can be improved considerably by applying some kind of caching in the set-top box 14, i.e. pre-fetching and storing data sections or objects in the set-top box which are likely to be accessed in the future. This pre-fetching of objects from the transport stream 12 is performed by extracting means 16, which extracting means 16 are included in the set-top box 14. Otherwise, if pre-fetching and caching is not used and the set-top box 14 wants to retrieve a part of the interactive application, the set-top box 14 must wait until that particular part is broadcast again. In order to be able to cache data, the set-top box 14 must have access to a storage device 19 like for instance a hard disk. The set-top box 14 can also use this storage device to store linear television content, like for instance short news bulletins or weather forecasts. These programs can be viewed by the user whenever this is convenient.

One particular example of an interactive application is an electronic newspaper. This application can consist of many objects in the carousel. These objects are to be presented to the user in some manner, e.g., a viewer application presents a front page representing the table of contents with links to other elements of the newspaper. Typical elements are: headlines, current affairs in politics, sports, the weather, etc. These elements are typically only relevant for a limited time and they can be replaced by more recent ones.

With respect to an electronic newspaper application the following steps can be distinguished:

Step 1: Subscribing

An end-user can subscribe to an electronic newspaper of some service provider. He can indicate in which parts of the electronic newspaper he is interested (e.g. sports, financials, and headlines).

Step 2: Setting a Filter

Based on the end-users' preferences, the electronic newspaper application will construct a filter, which is responsible to cache (pre-fetch) objects related to the service on local storage. For example, a filter can specify that all objects related to sports, financials or headlines should be pre-fetched (by the extracting means 16) and cached on the storage device 19.

Step 3: Filtering and Caching the Data

Once one or more filters have been set, the set-top box can start looking for the right data, retrieve it from the broadcast stream and cache it on local storage. This filtering is an ongoing process.

Step 4: Viewing

Once an end-user has subscribed to the electronic newspaper, he can select that application and view the parts in which he was interested. Naturally, the objects needed to present those parts must have been retrieved first during filtering (step 3).

The above mentioned filters can be specified using the hierarchical nature of the DSM-CC object carousel. For instance, a filter can specify that all objects in a specific sub-tree, e.g. /apps/newspaper/sports, have to be pre-fetched. This approach has, however, a number of disadvantages. To explain this some knowledge on DSM-CC object carousels in needed.

Figure 2:
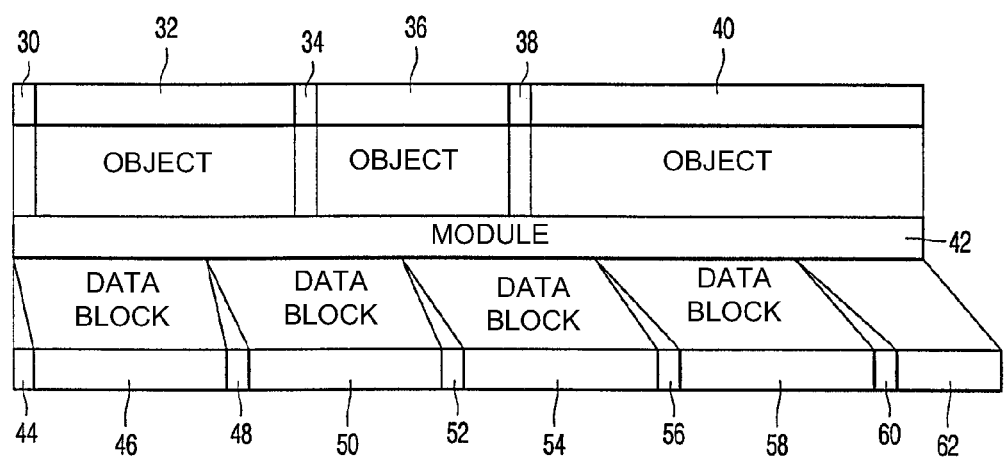
FIG. 2 shows a diagram of the layering used in DSM-CC object carousels.

In FIG. 2 the layered structure of DSM-CC object carousels is shown. The objects of a DSM-CC object carousel are broadcast in modules. Such a module is a container of objects and comprises a number of DownloadDataBlock messages (which are MPEG-2 private sections). In FIG. 2 module 42 comprises the objects 32, 36 and 40. These objects are including in so-called Broadcast Interoperable (BIOP) object reference messages. In such a BIOP-message the object is preceded by a message header. In FIG. 2 a first BIOP-message comprises a message header 30 and the object 32, which object may include directory information. A second BIOP-message comprises a message header 34 and the object 36, which object 36 may include stream information. A third BIOP-message comprises a message header 38 and the object 40, which object 40 may include file information.

Furthermore, the module 42 comprises five DownloadDataBlock messages. These DownloadDataBlock messages consist of a header and a data block. The first DownloadDataBlock message is formed by header 44 together with data block 46, the second DownloadDataBlock message is formed by header 48 together with data block 50, etc.

When a set-top box wants to pre-fetch a DSM-CC object, it must (among other things) know in which module the object resides. After it has retrieved the right module, the set-top box must parse the module to get to the object itself. Due to the hierarchical nature of the DSM-CC object carousel an object might be included in a subdirectory. If this is the case, the set-top box must also retrieve the module(s) with the intermediate directories, and parse them before it gets to the object in which it is interested.

Typically, the service provider broadcasts the object carousel in a compressed form. This compression is normally done at the module level. Thus, retrieving an object requires also the decompression of all the modules that are needed for the retrieval of the objects the set-top box is interested in.

The disadvantages of using the hierarchical nature of the object carousel for a filter specification are as follows. First, it requires that the set-top box must parse the module that contains an object in which the set-top box is interested. It must also parse the modules that contain an intermediate directory object in the path to the object. Also, all the directory objects in the specified sub-tree must be parsed, so the set-top box knows which other objects are part of the sub-tree. In short, this requires a lot of processing. Second, the set-top box must often decompress modules (in case they are compressed). However, the set-top box ideally wants to store the objects in local storage in a compressed form. This means that first a module is decompressed and that subsequently the individual objects are compressed. This is waste of processing power.

An efficient way for specifying a filter is to say that a filter should filter all modules that have a certain tag attached. This means that the filter no longer works at the object carousel layer, but at the module level (i.e., the data carousel layer). The advantages of this are that the set-top box no longer needs to parse any module when pre-fetching and that it can store modules in a compressed form if they were broadcast in compressed form, thus saving storage space.

Another advantage is that it is easy to find out which modules should be pre-fetched. The service provider periodically broadcasts a message listing the modules that are part of an object carousel, the 'DownloadInfoIndication' message. This message contains for each module a 'ModuleInfo' structure. This structure has a field 'userInfo'. The DSM-CC standard does not specify the use of this field; it is meant as an extension mechanism. This 'userInfo' field can easily contain the module tags. Thus, the set-top box retrieves the 'DownloadInfoIndication' message(s), and compares for each module the listed tags (in the 'userInfo' field) with the tags in the filter. If a tag matches, it pre-fetches the module.

Finally, it is easy to see whether a pre-fetched module needs updating. DSM-CC assigns to each module a version number (listed in the 'DownloadInfoIndication' message). Thus, to check whether a pre-fetched module is still up-to-date, the set-top box retrieves again the 'DownloadInfoIndication' message and compares the version numbers.

Next to the tag attribute, it may be desirable to add other attributes to modules. For instance, an expiration date attribute can tell the set-top box when the set-top box should remove the pre-fetched module (e.g., because it no longer valid or relevant). Another example is a cache priority attribute. The set-top box can use this cache priority to determine which modules it should pre-fetch and which not, when there is not enough storage space to pre-fetch them all.

The invention claimed is:

1. A transmission system for transmitting a multiplex signal from a transmitter to a receiver, said multiplex signal comprising a carousel having a plurality of modules each comprising at least one object that includes executable code, the receiver comprising extracting means for extracting objects from the multiplex signal, wherein the extracting means are embodied so as to extract the objects in dependence on module related information present in the multiplex signal, wherein the module related object extraction information is contained in a userInfo field of a DSM-CC DownloadInfoIndication message.

2. The transmission system according to claim 1, wherein each module includes a pre-fetch tag.

3. The transmission system according to claim 1, wherein the module related object extraction information is a set of one or more pre-fetch tags.

4. The transmission system according to claim 1, wherein each module includes a pre-fetch tag, wherein the module related object extraction information is a set of one or more pre-fetch tags, and the extraction means pre-fetches modules having a pre-fetch tag that is in the set of pre-fetch tags.

5. The transmission system according to claim 4, wherein each module includes version-identifying information, and the receiver does not pre-fetch a module if the receiver has a stored module having the same pre-fetch tag and version-identifying information.

* * * * *